US009495421B1

(12) United States Patent
DeHaan et al.

(10) Patent No.: US 9,495,421 B1
(45) Date of Patent: Nov. 15, 2016

(54) BIDIRECTIONAL DATA PORTABILITY

(71) Applicant: ATLASSIAN PTY LTD, Sydney (AU)

(72) Inventors: William DeHaan, Pacifica, CA (US); Ramiro Antonio Berrelleza Perez, San Francisco, CA (US); Jason Kinnon Blankenberg, Cedar Park, TX (US); John Anthony Pfeiffer IV, Belmont, CA (US)

(73) Assignee: ATLASSIAN PTY LTD, Sydney (AU)

( * ) Notice: Subject to any disclaimer, the term of this patent is extended or adjusted under 35 U.S.C. 154(b) by 0 days.

(21) Appl. No.: 14/884,653

(22) Filed: Oct. 15, 2015

(51) Int. Cl.
*G06F 17/30* (2006.01)

(52) U.S. Cl.
CPC ... *G06F 17/30489* (2013.01); *G06F 17/30292* (2013.01); *G06F 17/30353* (2013.01); *G06F 17/30377* (2013.01)

(58) Field of Classification Search
CPC .............. G06F 17/30289; G06F 17/30489; G06F 17/30353; G06F 17/30292; G06F 17/30377
See application file for complete search history.

(56) References Cited

U.S. PATENT DOCUMENTS

| 2011/0251992 | A1* | 10/2011 | Bethlehem | H04L 12/2863 707/610 |
| 2012/0011077 | A1* | 1/2012 | Bhagat | G06F 21/554 705/317 |
| 2014/0244585 | A1* | 8/2014 | Sivasubramanian | G06F 17/30289 707/639 |
| 2015/0052144 | A1* | 2/2015 | Mari | G06F 17/30598 707/740 |
| 2015/0142949 | A1* | 5/2015 | Nair | H04L 67/10 709/224 |

* cited by examiner

*Primary Examiner* — Tarek Chbouki
(74) *Attorney, Agent, or Firm* — Hickman Palermo Becker Bingham LLP

(57) ABSTRACT

A data processing method capable of providing improved bidirectional data portability includes receiving, at a first device, a request from a client computer to export data records related to the client computer, wherein the data records have been created under control of a first instance of an application program, where at least a portion of the data records have a first creation timestamp, identifying the data records, generating a package for export of the data records by formatting the data records into an intermediate format, by a second device, opening the package and providing the data to a second instance of an application program on the second device, where a portion of the data records have a second creation timestamp that is later than the first creation timestamp, creating the data records, and setting, for each data record of the portion, the second creation timestamp to the first creation timestamp.

20 Claims, 5 Drawing Sheets ns to the claims in this application and
are not admitted to be prior art by inclusion in this section.
BIDIRECTIONAL DATA PORTABILITY

TECHNICAL FIELD

The present disclosure generally relates to improved computer-implemented methods, computer software and computer systems that provide bidirectional data portability between multitenant computer systems and single-tenant computer systems. The disclosure relates more specifically to enabling a client computer to transfer application data associated with a particular tenant from a multitenant database and computer system to a single tenant server deployment, and the converse, as well as from a first single tenant server computer to a second single tenant server computer.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The rise in hardware and software support costs has given way to a new technology delivery model in which an application service provider hosts applications coupled to data storage units on networked devices that are owned by the application service provider. The application service provider's customers, typically business enterprises, connect to the hosted applications via a web browser or other application, and use the hosted applications with the expectation that the applications and any data entered into or created by the applications will be available on-demand whenever needed. Any type of application may be host be hosted, such as a database application, a chat or messaging application, a data analysis application, productivity applications, etc.

Simultaneously, deployments of applications on servers owned or otherwise controlled by the client computer which is using the application are commonplace. In particular, these single tenant deployments are "behind the firewall," meaning that the server the application is executing on is behind the private firewall of the client computer. Applications on behind the firewall servers may include the exact same functionalities as applications accessed at a multitenant service provider. As businesses grow, their needs may change, and the businesses may desire to move between various deployments of an application. This, however, is not a seamless experience, and improvements in the area would be welcome.

DESCRIPTION OF EXAMPLE EMBODIMENTS

Figure 1:
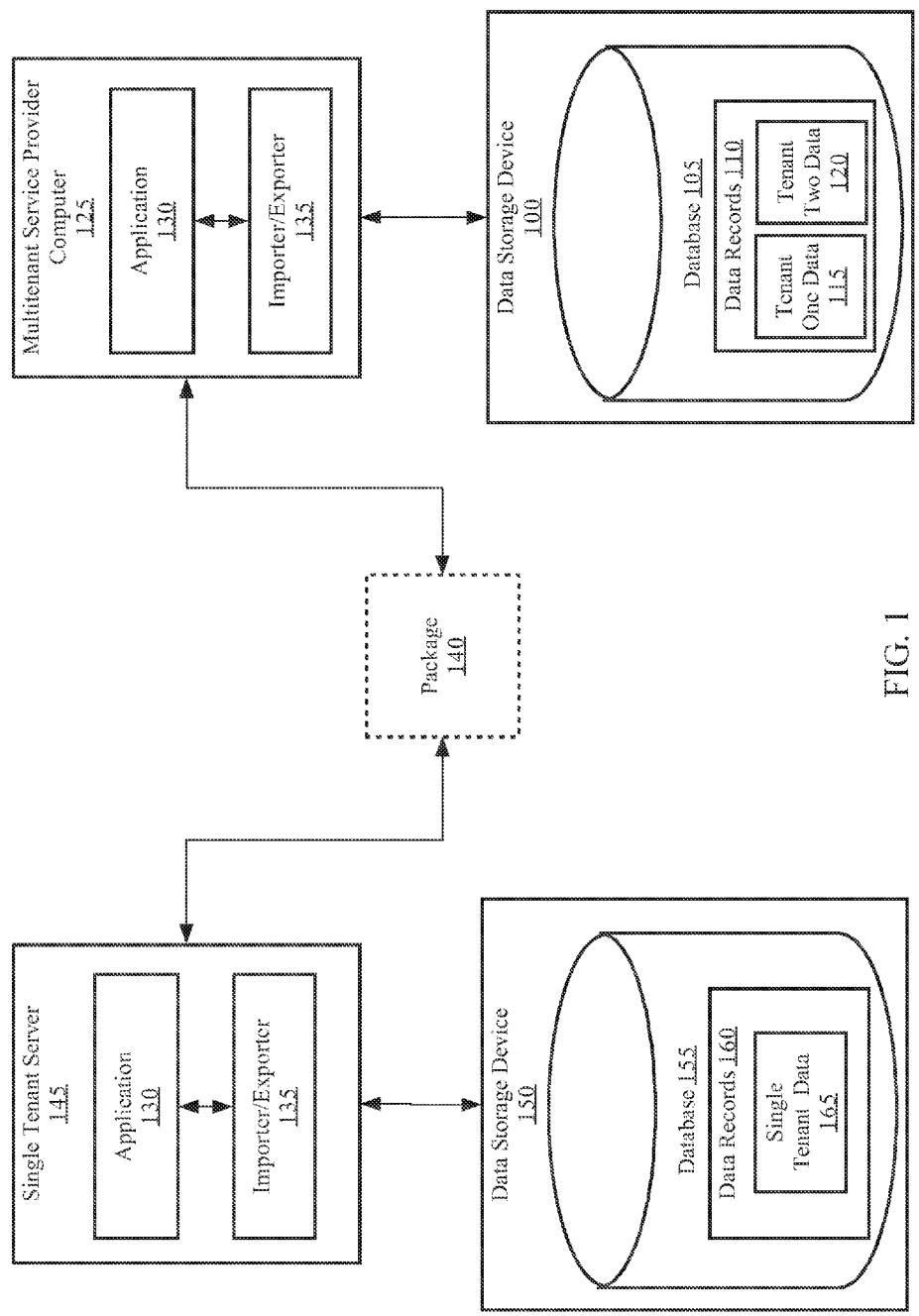
FIG. 1 illustrates a computer system that is programmed to enable bidirectional data portability in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described according to the following outline:

1. GENERAL OVERVIEW
    2. EXAMPLE SYSTEM IMPLEMENTATION
    3. EXAMPLE FUNCTIONAL IMPLEMENTATION
    4. IMPLEMENTATION EXAMPLE—HARDWARE OVERVIEW
    5. EXTENSIONS AND ALTERNATIVES

1. General Overview

Computer-implemented techniques are provided to enable bidirectional data portability. Specifically, an improved computer-implemented technique allows client computers to transfer their data between a multitenant system and a behind the firewall system, from a behind the firewall system to a multitenant system, and between different behind the firewall systems.

In one embodiment, a data processing method capable of providing improved bidirectional data portability comprises receiving, at a multitenant service provider computer that is coupled to a multitenant shared database on a digital data storage device that stores data associated with all of a plurality of client computers that are associated with different tenant entities, a request from a client computer of the plurality of client computers to export a plurality of data records related to the client computer from the shared database, wherein the data records have been created under control of a first instance of an application program, and wherein at least a portion of the plurality of data records each comprises a first creation timestamp. The data processing method further comprises identifying, by the multitenant service provider computer, the plurality of data records in the shared database; generating, by the multitenant service provider computer, a package for export comprising the plurality of data records by formatting the plurality of data records into an intermediate format, by a server controlled by the client computer, opening the package and providing each of the plurality of data records related to the client computer to a second instance of an application program on the server, wherein at least the portion comprise a server creation timestamp that is later than the first creation timestamp, with instructions configured to cause the application program to create the data records on the server that is controlled by the client computer, setting, by the server and in each data record of the portion, the server creation timestamp to the first creation timestamp.

In one embodiment, a data processing method capable of providing improved bidirectional data portability comprises receiving, at a server controlled by a client computer, a request to export a plurality of data records related to the client computer from a database, wherein the data records have been created under control of a first instance of an application program, and wherein at least a portion of the plurality of data records each comprises a server creation timestamp. The data processing method further comprises identifying, by the server, the plurality of data records in the database; generating, by the server, a package for export comprising the plurality of data records by formatting the plurality of data records into an intermediate format, by a multitenant service provider computer that is coupled to a multitenant shared database on a digital data storage device that stores data associated with all of a plurality of client computers that are associated with different tenant entities, opening the package and providing each of the plurality of data records related to the client computer to a second instance of an application program on the multitenant service provider computer, wherein at least the portion comprise a first creation timestamp that is later than the server creation timestamp, with instructions configured to cause the application program to create the data records on the multitenant service provider computer, setting, by the multitenant service provider computer and in each data record of the portion, the first creation timestamp to the server creation timestamp.

In one embodiment, a computer system comprises a multitenant service provider computer that is coupled to a multitenant shared database on a digital data storage device that stores data associated with all of a plurality of client computers that are associated with different tenant entities, a server coupled to a second data storage device, wherein the server is controlled by a client computer of the plurality of client computers. The multitenant service provider computer and the server are programmed to perform: receiving, a request from the client computer of the plurality of client computers to export a plurality of data records related to the client computer, wherein the data records have been created under control of a first instance of an application program, and wherein at least a portion of the plurality of data records each comprises a first creation timestamp; identifying the plurality of data records, generating a package for export comprising the plurality of data records by formatting the plurality of data records into an intermediate format, opening the package and providing each of the plurality of data records related to the client computer to a second instance of an application program, wherein at least the portion comprise a second creation timestamp that is later than the first creation timestamp, with instructions configured to cause the application program to create the data records, setting, in each data record of the portion, the second creation timestamp to the first creation timestamp.

Throughout this specification, reference will be made to a chat and/or messaging application. However, the invention is not limited to a chat and/or messaging application. Rather, the invention applies to any application that may be deployed in a multitenant system and a behind the firewall or single tenant system. Additionally, the terms "client" and "tenant" may be used interchangeably throughout the specification.

2. Example System Implementation

FIG. 1 illustrates an example computer system in which the techniques described may be practiced, according to one embodiment. In an embodiment, a computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

The system shown in FIG. 1 includes data storage device 100, database 105, data records 110, tenant one data 115, tenant two data 120, multitenant service provider computer 125, application 130, importer/exporter 135, package 140, single tenant server 145, data storage device 150, database 155, data records 160, single tenant data 165. Data storage device 100 may be any suitable storage device such as one or more hard disk drives, memories, or any other electronic digital data recording device configured to store data. Although data storage device 100 is depicted as a single device in FIG. 1, data storage device 100 may span multiple devices located in one or more physical locations. For example, data storage device 100 may be one or more nodes of one or more data warehouse(s). Additionally, in one embodiment, data storage device 100 may be located on the same device(s) as multitenant service provider computer 125. Alternatively, data storage device 100 may be located on a separate device(s) from multitenant service provider computer 125.

In one embodiment, data storage device 100 includes database 105, data records 110, tenant one data 115, and tenant two data 120. Database 105 is a database implemented using any suitable methodology, such as a relational database, a columnar database, etc. Database 105 may be of any size, portioned into any number of rows, columns, tables etc., and may be organized in any manner. Database 105 stores data records 110. Depending on the intended use of database 105, data records 110 may relate to any number of different tenants, such as tenant one data 115 and/or tenant two data 120, and embodiments specifically contemplate operating with hundreds to thousands of tenants or more depending on resource capacity and throughput. Further, data records 110 may relate to any type of data, such as chat or messaging application data, personal information, business information, governmental data, health data, environmental data, police or military data, etc. Individual data records may have any number of fields, components, or other aspects.

In one embodiment, data records 110 may be files, messages, notifications, user data, chat room data, metadata, or other information related to a chat and/or messaging application. Examples include, but are not limited to: user account data (including, but not limited to: ID, name, email address, password, nickname, job title, time zone, avatar, notifications settings, access privileges, etc.), chat room data (including, but not limited to: ID, name, owner, topic, created date, privacy settings, members, participants, statistics, message retention policy settings, etc.), message data (including, but not limited to: message type, from user, to user, file URL, date, mentions, message body, timestamp, message ID, format, etc.), file attachments (including, but not limited to: ID, user ID, name, thumbnail, size, description, date, etc.), emoticons (including, but not limited to: ID, url, width, height, audio, media file, user id, etc.), etc.

The terms "tenant one" and "tenant two" refer to two different example entities which are tenants of the database system. Typically the multitenant database system is programmed to maintain strict separation in the delivery of data to tenants, so that data of tenant one cannot be delivered to tenant two, and the converse. However, the data actually may be commingled on the data storage devices, with separation of the data enforced using programmed software. Tenants may be individuals, associations, or companies or other legal entities in various embodiments. In one embodiment, tenant one data 115 is accessible only by tenant one, while tenant two data 120 is accessible only by tenant two, even though the data for tenant one and/or tenant two may be stored in the same database. However, some interactions between the data of different tenants may occur. Some aspects of the data, such as user names or email addresses, may be globally unique, meaning unique among all similar data of all tenants, even unrelated tenants. Thus, for example, in a multitenant service, if tenant one has a user account named "user1" then tenant two may not have a user account named "user1" even though virtually all other aspects of their data are separate and unrelated. In one embodiment, any number of files, fields, etc., may be unique on a system wide level.

In one embodiment, multitenant service provider computer 125 is owned by, operated by, or associated with an application service provider that provides an online, real-time application program based upon software as a service (SaaS) environment that is used by or accessible to multiple tenants, such as the tenants associated with tenant one data 115 or tenant two data 120, and accessed using client computers (not shown) coupled over one or more networks to multitenant service provider computer 125. The client computers may be any computing devices that are capable of accessing online networks and communicating data, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Further, client computers may include applications, operating system software, and/or other programs. In an embodiment, each tenant comprises one or more client computers, and has a customer relationship with the service provider that owns or operates the multitenant service provider computer 125.

Multitenant service provider computer 125 is communicatively connected to data storage device 100 and any client computers using any suitable wired and/or wireless connection, including, but not limited to: a Local Area Network (LAN), a Wide Area Network (WAN), the Internet, a company network, etc.

In one embodiment, multitenant service provider computer 125 may provide any number of different applications to any number of tenants, and the particular number of applications and tenants is not critical. In one embodiment, multitenant service provider computer 125 may provide one or more applications that enable tenants to store and/or access data on data storage device 100, such as application 130. Application 130 may be any type of application providing any functionality. In one embodiment, application 130 is a chat or instant messaging application that may be used by entities to enable better collaboration, productivity and efficiency between coworkers. Application 130 is available in a "behind the firewall" client-server deployment, in which application 130 executes on single tenant server 145. Or, application 130 may be configured using a cloud based SaaS deployment in which the application 130 executes on multitenant service provider computer 125. The functions of application 130 may be the same regardless of which version is used by a client computer.

In one embodiment, application 130 manages, in a database, records representing user accounts, virtual chat rooms, and messages; in this context, a chat room comprises an association of data that includes a set of user accounts, a set of messages, and a timestamp indicating a time period during which the chat room exists or existed. Records for user accounts may include columns that identify guests and per-user properties, such as avatar images and historical contexts. Records for rooms may comprise columns with attribute values describing properties such as public or private, including membership and historical context. Records for user accounts also may include pointers or other references to is transcript files comprising transcripts of their chat histories, and all file attachments sent in messages. Records for rooms also may comprise pointers or references to corresponding transcript files of chat history for that room, and all file attachments shared in the given room.

In one embodiment, application 130 includes importer/exporter 135. Alternatively, importer/exporter 135 may be a separate application or component. Importer/exporter 135 comprises program instructions that are programmed or configured to import and/or export the data of a tenant from one version and/or deployment of application 130 to another version and/or deployment of application 130, and to modify or supplement the data of a tenant so that after import or export, full functionality, history, and accuracy is achieved on the new system. For example, using importer/exporter 135, a client computer can switch from a cloud based application to a behind the firewall application, and individual users will not notice any differences in function or operation. As an example, importer/exporter 135 is programmed to export data from a multitenant SaaS deployment of application 130 to a single tenant, behind the firewall deployment of application 130, or to implement the converse. As another example, importer/exporter 135 may export data from one single tenant server of the client computer to another single tenant server of the client computer.

In one embodiment, importer/exporter 135 comprises program instructions that are programmed or configured to receive requests to export client computer data and identify the data records for export. The requests may be received in any manner and in any format, such as through a web interface or application interface. The requests may include a password for encrypting or unencrypting a package of data that is generated during the export process, identifiers of specific data files or elements to be included in the export, and a username or other means of authentication to show that the request is authorized. The package of data that is generated during the export process is in a machine parseable intermediate form, and contains all of the data that was exported from a system. The package 140 is discussed in more detail, below. The request may be for a single tenant server, or a multitenant service provider to export client computer data. Importer/exporter 135 may identify the data records in any manner, such as iterating through the files associated with the requesting client computer, and tracking any further modifications made while the export process is proceeding. In one embodiment, if the application 130 is an internet-based chat or instant messaging application, then data for all users associated with the requesting client computer are identified first, followed by data associated with chat rooms, and then data associated with individual messages, as this order has been found to ensure that a proper file structure and relationships are maintained. In one embodiment, importer/exporter 135 identifies and retrieves the data for export in batches, so that service to the client computer is not slowed or interrupted during the export process.

In one embodiment, importer/exporter 135 comprises program instructions that are programmed or configured to generate a data package 140 in an intermediate format. In one approach, package 140 is a machine parseable file or grouping of files that contain all information for export to a new system. When imported by the new system, package 140 allows the importer/exporter 135 to successfully import client computer data, and complete transfer of the data to a new single or multitenant deployment, without a loss in data accuracy or functionality. The format of package 140 consists of a variety of files identifying the data for export. For example, if the package 140 is for a chat or messaging application, the package may include, but is not limited to a metadata file describing the contents of the package and application programming interface (API) dependencies; a users file describing all user accounts including guests and per-user properties such as avatar images and historical contexts; a rooms file describing all of the rooms with their properties such as public or private, including membership and historical context; for each user in the users file, there is a corresponding transcript file of their chat histories, and all file attachments sent in messages; for each room in the room file, there is a corresponding transcript file of the chat history for that room, and all file attachments shared in the given room.

In one embodiment, the data in package 140 includes data added at the time package 140 is created. For example, for a chat or messaging application, each message must contain a timestamp to enable backdating to occur at the receiving system. Thus, importer/exporter 135 may check each message for the presence of a timestamp and, if a timestamp is not present, a timestamp is added to the message based on other timestamps occurring near the message such as a prior or subsequent message from the same user, or a prior or subsequent message occurring in the same chat room. Package 140 may be encrypted using a cipher with a user specified passphrase, and may be compressed. In one embodiment, the cipher is a publicly available encryption standard, such as the American Encryption Standard 256-bit-keyed block cipher ("AES-256-CBC").

In one embodiment, passwords, such as those needed to login to specific user accounts, are not included in package 140. Rather, after package 140 is imported on a new system, users will be prompted to enter a new password. The prompting may be implemented in programming in an authentication system that is separate from the importer/exporter 135, which may be programmed to omit user account passwords for the purpose of triggering the authentication system to authenticate a user account by prompting a client computer to enter user account credentials.

Further, package 140 may include data related to deleted records if, for example, other records reference or refer to the deleted records. As an example, in a chat or messaging application, user account records of deleted users are exported to package 140 because the messages sent from these deleted users may still appear to other users.

In one embodiment, importer/exporter 135 comprises program instructions that are programmed or configured to store and provide access to package 140. Package 140 may be stored at any suitable location, such as a data storage device associated with multitenant service provider computer 125, single tenant server 145, or storage device associated with a third party. Package 140 may be accessed via a link, file path, or other method. Because package 140 is encrypted using a user specified passphrase, access to package 140 does not need to be controlled, in one embodiment. However, optionally access to package 140 may be controlled in other means, such as physical security, folder permissions, or separate credentials for access to drives, folders or virtual disks in which the package is located.

In one embodiment, importer/exporter 135 comprises program instructions that are programmed or configured to receive a request to import a stored package, and create the client data records on a new server. The request may include a link or file path identifying where the package for import is located, as well as the passphrase needed to decrypt the files. Additional information may be included in the request optionally, such as where the package should be unpacked on the new server, or any other suitable information.

In response to the request, the stored package may be retrieved under control of the importer/exporter 135, using file read operations directed to the link or file path in the request. Retrieval may include decryption, followed by providing the data records to a copy of the application 130 that is hosted on the new system, with a reference specifying storage to a particular location of a digital storage device that is coupled to the new server. The location may be a default location with respect to a root folder, and the default location may be hard-coded in the importer/exporter 135, or specified in a configuration file. Or, data from the request specifying where the package should be unpacked on the new server may be used to determine the location for creating.

"Creating," in this context, means providing a copy of a decrypted file or record to the instance of the application 130 that is hosted on the new system, and permitting that application instance to copy the data records to storage associated with the new system, with or without modification of the data records, or to create different records on the new system that are based upon the copy of the file or record that was decrypted. In other words, creating is not merely copying, but involves permitting the application 130 instance on the new system to control the form and content of files or records that are created in the new system. For example, in a chat or messaging application, individual user accounts may be created one at a time as though the users were registering for the first time on the new system. In one embodiment, the data records are created on a server that has no preexisting data for application 130. In other words, a clean install is performed. The data records may be created in the order in which they are stored in package 140. The data records may be recreated one by one by the application on the new system, as simply copying files may not ensure proper functionality and accuracy.

In one embodiment, importer/exporter 135 comprises program instructions that are programmed or configured to determine duplicate and/or unique data and resolve conflicts. In particular, a check may be performed during importing to ensure that there is no duplicate information in system wide unique fields. Duplicate values, records or files may occur when importing into a multitenant system, as other users for other client computers may already have registered or otherwise created the same data that an imported user has. For example, if usernames are globally unique, then an account record for a "user1" for a preexisting client computer will cause a conflict with an account record for a "user1" for the imported client computer. In the event of duplicates in globally unique fields, importer/exporter 135 appends random alphanumeric characters to the end of the imported unique field. Thus, "user1" may become "user162973" or "user1987426." However, in one embodiment, if there is a duplicate in a non-system wide unique field, the duplicates may be merged. For example, if a chat room is created, deleted, and recreated with the same name, and subsequently exported, then on import the second instance of the chat room may be deemed a duplicate of the first. However, because they are actually the same chat room, the two instances should be merged together. Importer/exporter 135 may resolve these conflicts on import, on export, or at some combination of on export and on import.

In one embodiment, importer/exporter 135 comprises program instructions that are programmed or configured to backdate timestamps. Without backdating, because all of the data records are newly created upon importing to a new system, the timestamp associated with these newly records is the time at which they were imported to or created on the new system. Permitting the use of that form of timestamp could result in errors or inconsistencies because the data records were actually created at an earlier, different time on the originating system. Therefore, in an embodiment, the timestamp on the new system is backdated to the time when the data records were originally created on the system from which package 140 was exported. Importer/exporter 135 may backdate any timestamps as needed to ensure accuracy.

In one embodiment, at the time of an export, each file or record in the package 140 bears a timestamp value matching the timestamp value that was created at the originating system. In the event that a file or record does not bear a timestamp, one is added to the file or record based on nearby files or records, such as a subsequent or prior message from the same user. In an embodiment, importer/exporter 135 is programmed or configured, at the time of importing files or records from a package to a new system, to read and store a list of timestamp values and associated files or records, as the files or records are decrypted and provided to the instance of the application 130 on the new system. Thereafter, when installation on the new system is complete, importer/exporter 135 steps through each file or record in the list of timestamps, retrieves that file or record from the new system, modifies the timestamp and updates the stored file or record. Optionally, backdating of the timestamps may occur at the same time, or shortly after, a file is created on the new system, rather than waiting for installation to complete. In one embodiment, importer/exporter writes the timestamps to the persistence layer of the associated files or records.

In one embodiment, single tenant server 145 is any computing device, including, but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Single tenant server 145 may include any of the functionalities discussed for multitenant service provider computer 125, except that single tenant server 145 is behind the firewall of the single tenant or client computer that controls single tenant server 145. For example, single tenant server 145 may be at a data center for a given business, and is only used by employees of the business, in contrast to multitenant service provider computer 125 which is used by multiple different businesses.

Single tenant server 145 executes application 130, and importer/exporter 135. As discussed above, application 130 and importer/exporter 135 executed by single tenant server 145 include all of the functionalities discussed above. Likewise, data storage device 150, database 155, and data records 160 may be any of the devices and may include any of the functionalities discussed above with regards to data storage device 100, database 105, and data records 110. Like single tenant server 145, data storage device 150, database 155, and data records 160 are used for a single client computer, as shown by single tenant data 165. Single tenant data 165 may include any of the information discussed above with regards to tenant one data 115 and/or tenant two data 120.

3. Example Functional Implementation

Figure 2A:
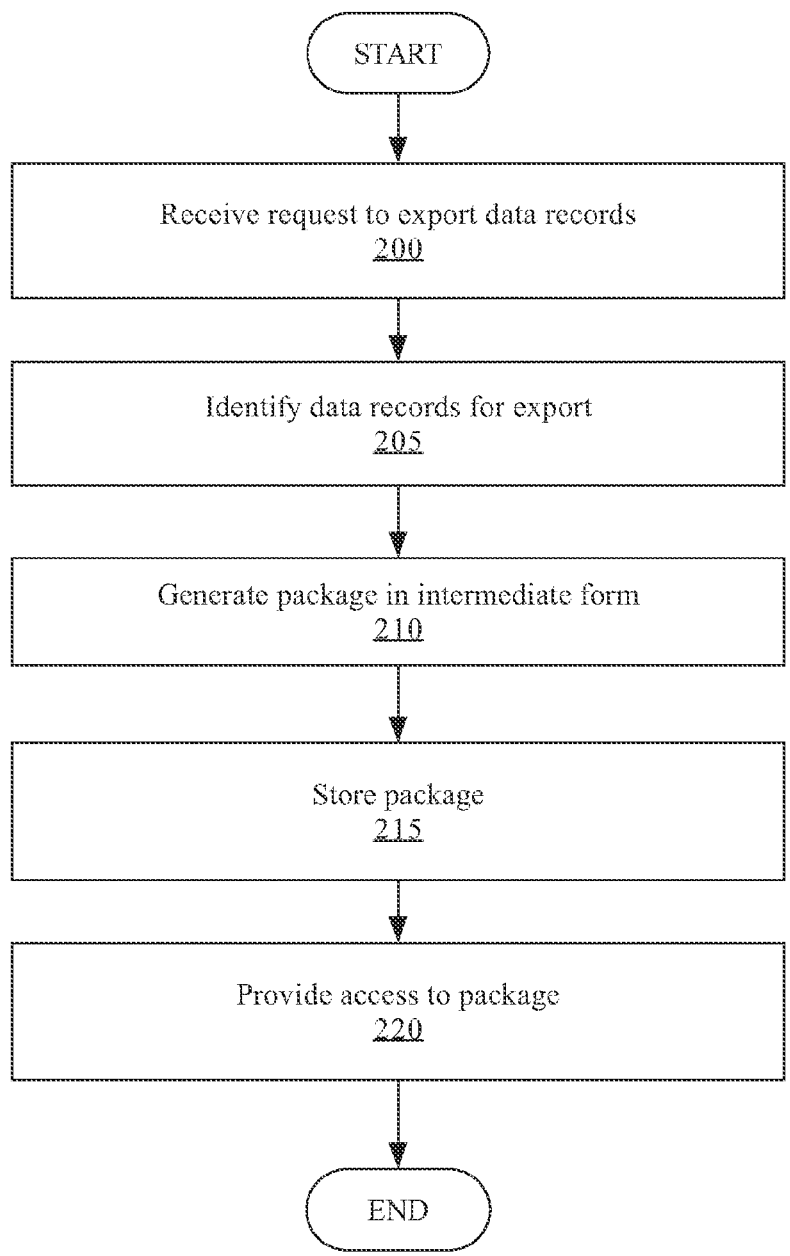
FIG. 2A and FIG. 2B illustrate a programmable algorithm or method to enable bidirectional data portability in accordance with an embodiment.
Figure 2B:
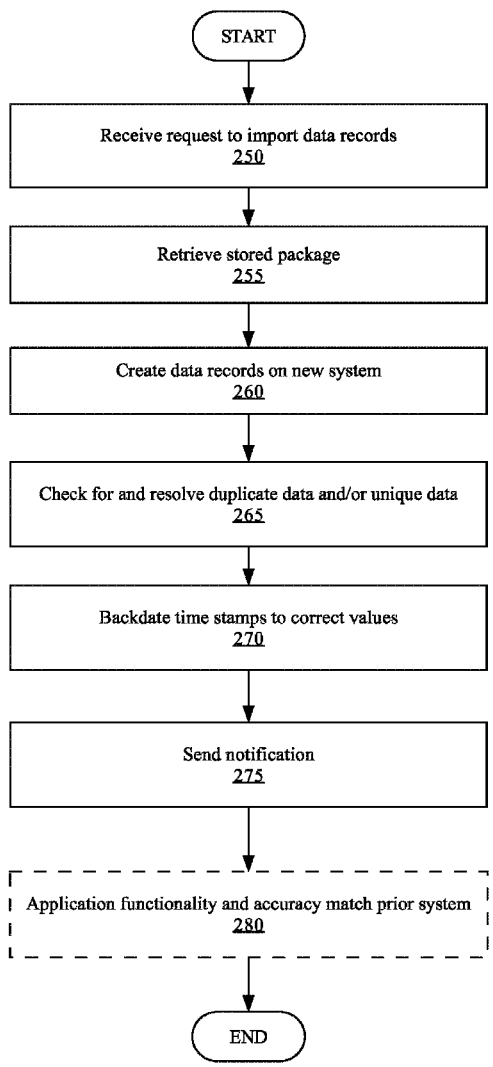

FIG. 2A and FIG. 2B illustrate an example programmable algorithm or method for bidirectional data portability. Although the steps in FIG. 2A and FIG. 2B are shown in an order, the steps of FIG. 2A and/or FIG. 2B may be performed in any order, and are not limited to the order shown in FIG. 2A and/or FIG. 2B. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

Beginning with FIG. 2A, in step 200, a request is received to export data records. The request may be received from an authorized user. The user may be authorized in any manner, such as by providing a password. In one embodiment, only a senior user, such as an administrator may begin the export process. Additionally, the request may include a passphrase for use in encrypting the exported data records, to ensure that no unauthorized individuals may access the bulk data contained in the package. The request may further specify which data records to export, how far back historical data should be exported, or any other setting. The data records may relate to any type of data or files including, but not limited to: user account data, chat room, message data, file attachments, and emoticons. The request may be received at a single tenant server or at a multitenant service provider.

In step 205, data records are identified for export. The data records may be identified by iterating through one or more databases where the data records are located. In particular, in the context of a chat or messaging application, first users records are identified, then chat rooms, and finally messages. By identifying the records in this order, dependencies and other errors are minimized. Step 205 may be performed while the system is live and further records and data are being generated.

In step 210, a package is generated in an intermediate format. Step 210 may be performed at the same time as step 205. The package is generated in batches, so that the functioning of the system(s) is not effected by the exporting process. The package may be encrypted, compressed, and structured in a specific, machine parseable way. Specifically, the package may contain files describing all of the data for export. For example, the package allows an importing system to recreate all user accounts or other data by providing needed data to an application as input, and allowing the application to recreate the relationships as the relationships existed on the original system. The package may be structured in any way, and may vary based upon the type or amount of data being exported. Optionally, additional data may be added to the data records or existing data may be modified during the process of exporting. For example, if a record does not contain timestamp data or metadata, then appropriate timestamp data or metadata may be added to the record based on other nearby records. In one embodiment, passwords, such as passwords for individual user accounts, are not included in the package. Rather, upon first accessing their account after importing, the users may be prompted to enter a new password.

In step 215, the package is stored. The package may be stored in any location, such as a database associated with the client computer, the multitenant service provider, or a third party.

In step 220, access is provided to the package. Access may be provided in any manner, such as through a link or file path. Access to the package may or may not be restricted.

Turning to FIG. 2B, in step 250, a request is received to import a package. The request may be received at a single tenant server or at a multitenant service provider. The request may include the link, file path, or other method for accessing the package, and the passphrase needed to decrypt the package. The request may also include any further information, such as where the new system for importing is located, or where to create files on the new system.

In step 255, a stored package is retrieved. The stored package may be retrieved in any manner.

In step 260, data records are created on the new system. Specifically, the data records created on the new system are meant to mimic the data records as they existed on the original server or multitenant service provider. Data from the package is fed into an application on the new system, and the application recreates the user accounts, chat rooms, messages, file attachments, emoticons, and other records as though the data was actually sent or generated using the application on the new system. The data records may be created in a same or similar order to when they were created on the original server or multitenant service provider based on, for example, timestamps. In a chat or messaging application context, first user accounts are recreated, followed by chat rooms, and finally messages. Creating the data records in such an order ensures that a minimal amount of dependency errors will occur. In one embodiment, a clean install of the data records is performed. The data records may be created in batches, to limit the impact on the server or multitenant service provider on which the data records are being created. Although shown in FIG. 2B as separate steps, step 260, 265, and 270 may be performed as a single step, as two steps, and/or in a different order.

In step 265, duplicate and/or unique data is checked for, and any conflicts are resolved. Some fields or data may require system wide uniqueness, such as email addresses, usernames. In the event that a duplicate is detected in a system wide unique data record or field, the importer will add random values to the data record or field and create the newly generated data record or field. Additionally, an error will be logged, and an administrator or user will be notified of the change. Alternatively, if a duplicate is detected in a data record or field that is not a system wide unique, then the duplicative data may be merged into a single record or field. Any merges of duplicative data may also be logged and reported to an administrator or user.

In step 270, time stamps are backdated. Specifically, time stamps are backdated as needed to restore the data records to the same state as they existed on the prior system before the import/export process began. For example, for an application to function properly, user accounts may not simply be copied over during the import process. Rather, the new application must go through the creation process for each account, and during the process, rather than setting the creation timestamp for the user to the current date and time, the historical date and time (which accurately reflects when the user account was created on the prior system) is set to the account creation timestamp. Alternatively, the timestamps may be backdated after installation is fully or partially completed. The timestamps may be written to the persistence layer of the associated files. The timestamps used in step 270 may influence the order in which steps 260 and/or 265 are performed. For example, step 260 may proceed from the earliest timestamp to the most recent timestamp, to minimize errors in the creation process.

In step 275 a notification is sent. The notification may be sent to any suitable entity, such as the user requesting the export and/or import, an administrator, any users affected by the importing, etc. The notification may be sent in any manner using any format. The notification may indicate any errors encountered during the import process, any changes made to data during the import process (such as fields changed due to conflicts in system wide unique records or fields, any merges of data performed, etc.), and may report on any other information generated during the import process.

In step 280, the functionality and accuracy of the application match the prior system. As indicated by the dotted lines, step 280 is the result of performing the methods described in FIGS. 2A and 2B. Specifically, individual users who are unaware of the import/export process may not notice any changes in functionality or accuracy, or individual users may notice minor differences such as a prompt to reset their password, or that the application is accessed from a slightly different location. Importantly, each user's data appears as it did before the export/import process occurred. Thus, in the context of a chat or messaging application, if a user were to open a chat room on a new system that contained month old messages from a now-deleted user, that chat room would be displayed accurately—the messages are dated from a month ago, and indicate that the now-deleted user sent the messages, even though that user was deleted prior to the import/export process. Due to the use of a machine parseable intermediate package, the process herein allows for single tenant server to single tenant server import/export, single tenant to multitenant import/export, and multitenant to single tenant import/export. Additionally, the intermediate package may also be used as a backup, as all the information needed to recreate a client's data is contained within the intermediate package.

Figure 3:
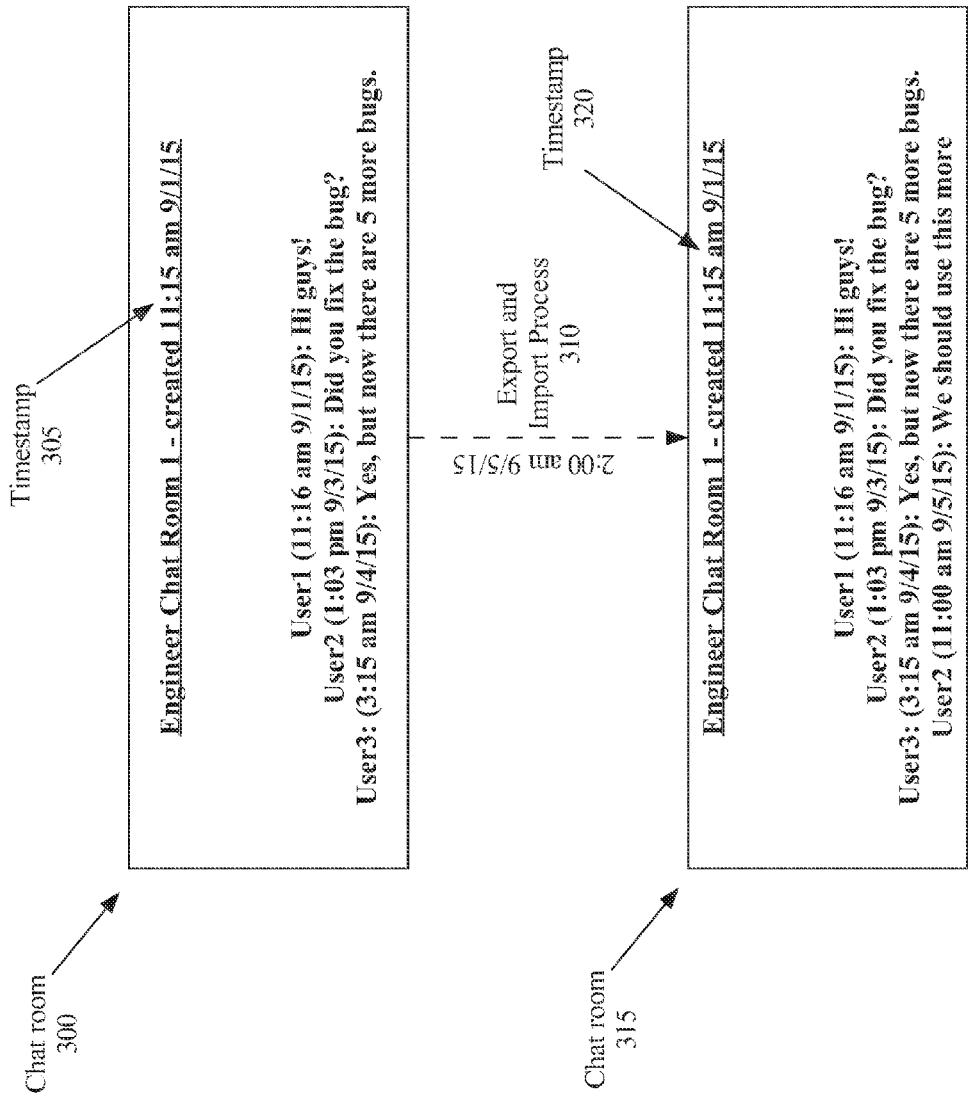
FIG. 3 illustrates an example of bidirectional data portability in accordance with an embodiment.

FIG. 3 illustrates an example of bidirectional data portability in accordance with an embodiment. The example shown in FIG. 3 has been simplified for purposes of clarity, and is intended as just one example and not to limit the disclosure to the specifics disclosed herein.

FIG. 3 shows chat room 300, which is named "engineer chat room 1." The chat room is for a startup company. Chat room 300 was created at 11:15 am on Sep. $1^{st}$, 2015, as indicated by timestamp 305. Because the startup company was small and unfunded, they opted to utilize a chat application provided by a multitenant service provider. This minimized their time and hardware costs, and allowed the engineers to spend their time coding, rather than setting up and maintaining a behind the firewall deployment. Chat room 300 shows an ongoing conversation between user1, user2, and user3.

Luckily for the engineers, their startup was funded the next day, and they decided they should buy some servers and move their chat service behind their own firewall. Thus, at 2:00 am on Sep. 5, 2015, the startup began the export and import process 310 to move their chat application data to their newly purchased behind the firewall server in their own building. In the export process, all of the data associated with chat room 300, user1, user2, and user3 was packaged into an intermediate package, and subsequently imported by the new behind the firewall server. In the import process, the instance of the chat application executing on the behind the firewall server first recreated the user accounts for user1, user2, and user3, then recreated chat room 300, and finally recreated the messages. Chat room 315 is the "new" version of chat room 300, executing on the behind the firewall server of the startup company.

As part of the import process, even though chat room 315 was created on the behind the firewall server at 2:00 am on Sep. 5, 2015, the timestamp 320 shows that "Engineer Chat Room 1" was created on Sep. 1, 2015, at 11:15 am—the time at which chat room 300 was originally created on the multitenant service provider device. This is because the behind the firewall server backdated timestamp 320 of chat room 315 to match timestamp 305, so that the data is accurate and consistent with what existed before the export and import process 310 was begun. Once imported, chat room 315 is useable in the same manner as chat room 300 was used, with no noticeable differences to the users, as shown by user2 commenting that "we should use this more."

4. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
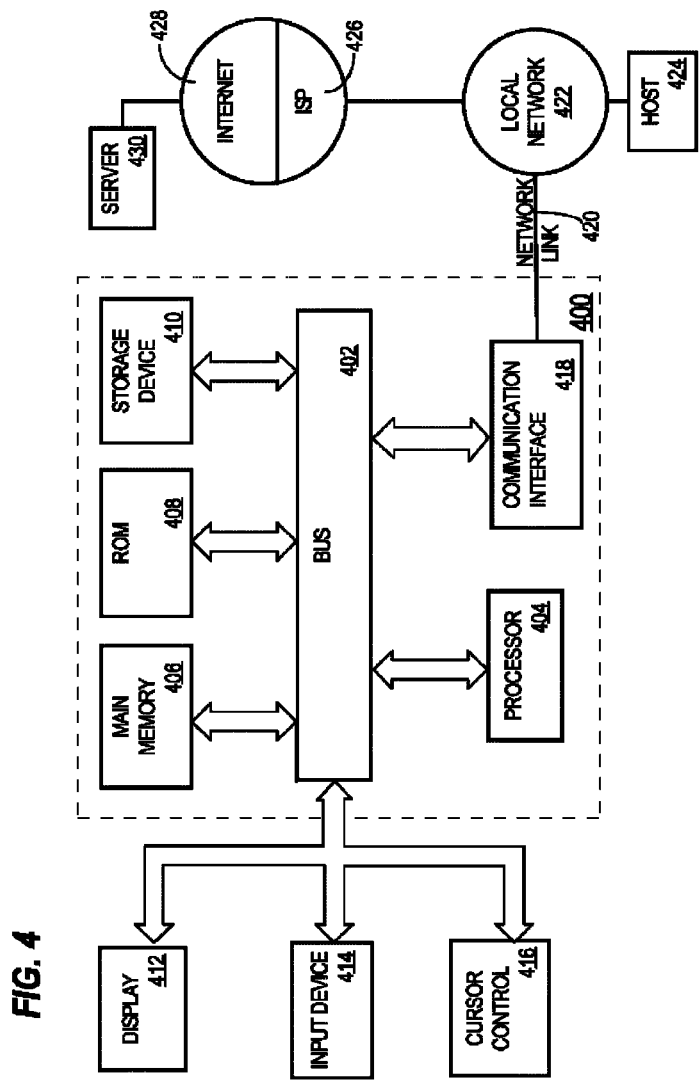
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

5. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method capable of providing improved bidirectional data portability, the method comprising:
   receiving, at a multitenant service provider computer that is coupled to a multitenant shared database on a digital data storage device that stores data associated with all of a plurality of client computers that are associated with different tenant entities, a request from a client computer of the plurality of client computers to export a plurality of data records related to the client computer from the shared database, wherein the data records have been created under control of a first instance of an application program, and wherein at least a portion of the plurality of data records each comprises a first creation timestamp;
   identifying, by the multitenant service provider computer, the plurality of data records in the shared database;
   generating, by the multitenant service provider computer, a package for export comprising the plurality of data records by formatting the plurality of data records into an intermediate format;
   by a server controlled by the client computer, opening the package and providing each of the plurality of data records related to the client computer to a second instance of the same application program on the server with instructions configured to cause creating the data records on the server that is controlled by the client computer, wherein at least each data record of the portion comprises a server creation timestamp indicating when a particular data record was created on the server that is later than the first creation timestamp;
   backdating, by the server and in each data record of the portion, the server creation timestamp by setting the server creation timestamp to a time corresponding to the first creation timestamp;
   storing, for each data record of the portion and after backdating, the server creation timestamp.

2. The method of claim 1, wherein each data record of the plurality of data records is related to one or more the group consisting of group metadata, users, chatrooms, messages, file attachments, and emoticons.

3. The method of claim 1, further comprising:
   determining, after opening the package, that a first data record of the plurality of data records related to the client computer is a duplicate of a second data record on the server;
   merging the first and second data record on the server that is controlled by the client computer.

4. The method of claim 1, further comprising:
   determining, by the server after opening the package, that a third data record of the plurality of data records related to the client computer comprises a system wide unique field, and the system wide unique field is duplicated in a fourth data record;
   appending, by the server, a random alphanumeric value to the system wide unique field of the third data record;
   sending, by the server, a notification.

5. The method of claim 1, wherein the server controlled by the client computer is behind a firewall of the client computer and the server controlled by the client computer is single tenant.

6. The method of claim 1, wherein the package is generated in batches while the multitenant service provider computer is live.

7. The method of claim 1, wherein the application program is any of a chat application and an instant messaging application.

8. A data processing method capable of providing improved bidirectional data portability, the method comprising:
   receiving, at a server controlled by a client computer, a request to export a plurality of data records related to the client computer from a database, wherein the data records have been created under control of a first instance of an application program, and wherein at least a portion of the plurality of data records each comprises a server creation timestamp;
   identifying, by the server, the plurality of data records in the database;
   generating, by the server, a package for export comprising the plurality of data records by formatting the plurality of data records into an intermediate format;
   by a multitenant service provider computer that is coupled to a multitenant shared database on a digital data storage device that stores data associated with all of a plurality of client computers that are associated with different tenant entities, opening the package and providing each of the plurality of data records related to the client computer to a second instance of the same application program on the multitenant service provider computer with instructions configured to cause creating the data records on the multitenant service provider computer, wherein at least each data record of the portion comprises a first creation timestamp indicating when a particular data record was created on the multitenant service provider computer that is later than the server creation timestamp;

backdating, by the multitenant service provider computer and in each data record of the portion, the first creation timestamp by setting the first creation timestamp to a time corresponding to the server creation timestamp;

storing, for each data record of the portion and after backdating, the first creation timestamp.

9. The method of claim 8, wherein each data record of the plurality of data records is related to one or more the group consisting of group metadata, users, chatrooms, messages, file attachments, and emoticons.

10. The method of claim 8, further comprising:

determining, after opening the package, that a first data record of the plurality of data records related to the client computer is a duplicate of a second data record on the multitenant service provider computer;

merging the first and second data record on the multitenant service provider computer.

11. The method of claim 8, further comprising:

determining, by the multitenant service provider computer after opening the package, that a third data record of the plurality of data records related to the client computer comprises a system wide unique field, and the system wide unique field is duplicated in a fourth data record;

appending, by the multitenant service provider computer, a random alphanumeric value to the system wide unique field of the third data record;

sending, by the multitenant service provider computer, a notification.

12. The method of claim 8, wherein the server controlled by the client computer is behind a firewall of the client computer and the server controlled by the client computer is single tenant.

13. The method of claim 8, wherein the package is generated in batches while the server is live.

14. The method of claim 8, wherein the application program is any of a chat application and an instant messaging application.

15. A computer system comprising:

a multitenant service provider computer that is coupled to a multitenant shared database on a digital data storage device that stores data associated with all of a plurality of client computers that are associated with different tenant entities;

a server coupled to a second data storage device, wherein the server is controlled by a client computer of the plurality of client computers;

the multitenant service provider computer and the server programmed to perform:

receiving, a request from the client computer of the plurality of client computers to export a plurality of data records related to the client computer, wherein the data records have been created under control of a first instance of an application program, and wherein at least a portion of the plurality of data records each comprises a first creation timestamp;

identifying the plurality of data records;

generating a package for export comprising the plurality of data records by formatting the plurality of data records into an intermediate format;

opening the package and providing each of the plurality of data records related to the client computer to a second instance of the same application program with instructions configured to cause creating the data records, wherein at least each data record of the portion comprises a second creation timestamp indicating when a particular data record was created by the second instance that is later than the first creation timestamp;

backdating, in each data record of the portion, the second creation timestamp by setting the second creation timestamp to a time corresponding to the first creation timestamp;

storing, for each data record of the portion and after backdating, the first creation timestamp.

16. The system of claim 15, wherein each data record of the plurality of data records is related to one or more the group consisting of group metadata, users, chatrooms, messages, file attachments, and emoticons.

17. The system of claim 15, the multitenant service provider computer and the server further programmed to perform:

determining, after opening the package, that a first data record of the plurality of data records related to the client computer is a duplicate of a second data record;

merging the first and second data record.

18. The system of claim 15, the multitenant service provider computer and the server further programmed to perform:

determining, by the second instance of the same application program, that a third data record of the plurality of data records related to the client computer comprises a system wide unique field, and the system wide unique field is duplicated in a fourth data record;

appending, by the second instance of the same application program, a random alphanumeric value to the system wide unique field of the third data record;

sending, by the second instance of the same application program, a notification.

19. The system of claim 15, wherein the server controlled by the client computer is behind a firewall of the client computer and the server controlled by the client computer is single tenant.

20. The system of claim 15, wherein the application program is any of a chat application and an instant messaging application.

* * * * *